(12) United States Patent
Egli

(10) Patent No.: US 7,875,706 B2
(45) Date of Patent: Jan. 25, 2011

(54) DISPERSE DYES

(75) Inventor: Robert Egli, Therwil (CH)

(73) Assignee: Clariant Finance (BVI) Limited, Tortola (VG)

( * ) Notice: Subject to any disclaimer, the term of this patent is extended or adjusted under 35 U.S.C. 154(b) by 944 days.

(21) Appl. No.: 10/582,418

(22) PCT Filed: Dec. 2, 2004

(86) PCT No.: PCT/IB2004/003959

§ 371 (c)(1),
(2), (4) Date: Jun. 9, 2006

(87) PCT Pub. No.: WO2005/056690

PCT Pub. Date: Jun. 23, 2005

(65) Prior Publication Data

US 2007/0107146 A1    May 17, 2007

(30) Foreign Application Priority Data

Dec. 10, 2003   (EP)   .................................. 03028367

(51) Int. Cl.
*C09B 29/085*   (2006.01)
*C09B 29/09*    (2006.01)
*D06P 1/18*     (2006.01)

(52) U.S. Cl. ........................ 534/788; 534/794; 534/853; 534/854; 8/529; 8/691; 8/692; 8/696; 8/922

(58) Field of Classification Search .................. None
See application file for complete search history.

(56) References Cited

U.S. PATENT DOCUMENTS

| | | |
|---|---|---|
| 3,549,611 A | 12/1970 | Altermatt et al. |
| 4,439,207 A | 3/1984 | Altermatt et al. |
| 5,420,254 A | 5/1995 | Altermatt et al. |
| 5,633,355 A | 5/1997 | Altermatt |
| 5,723,586 A | 3/1998 | Altermatt |
| 7,004,982 B2 | 2/2006 | Sieber |
| 2010/0092670 A1 * | 4/2010 | Jordan et al. ................ 534/676 |

FOREIGN PATENT DOCUMENTS

| | | |
|---|---|---|
| FR | 1445371 | 8/1966 |
| GB | 909843 | 11/1962 |
| WO | WO 95/20014 | 7/1995 |
| WO | WO 2004/035690 | * 4/2004 |

OTHER PUBLICATIONS

PCT International Search Report for PCT/IB2004/003959, mailed Feb. 10, 2005.

* cited by examiner

Primary Examiner—Fiona T Powers
(74) Attorney, Agent, or Firm—Anthony A. Bisulca

(57) ABSTRACT

Disperse dyes of the general formula (I)

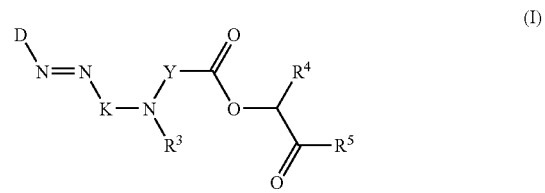

where
D is a diazo component derived from a substituted or unsubstituted aromatic amine,
K is an aromatic radical of the formula

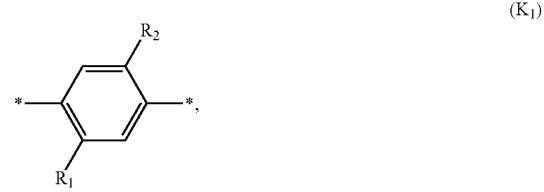

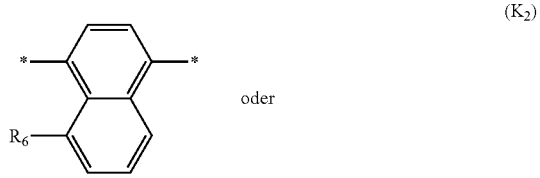

oder

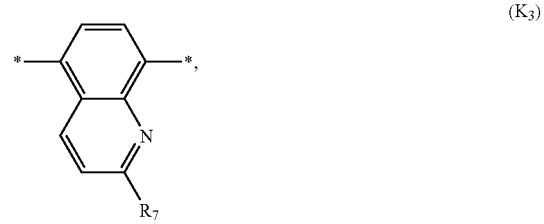

and the substituents are each as defined in the first claim. Further described are the preparation and the use of the dyes according to the invention.

9 Claims, No Drawings

DISPERSE DYES

The invention relates to disperse dyes of the general formula (I)

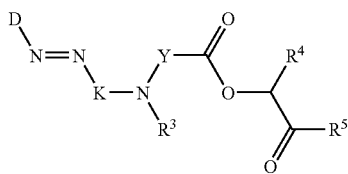

where
D is a diazo component derived from a substituted or unsubstituted aromatic amine,
K is an aromatic radical of the formula K, $K_2$ or $K_3$

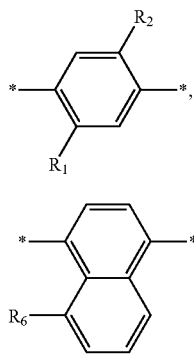

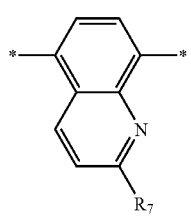

$R_1$ is hydrogen, chlorine, $C_{1-2}$-alkyl, $C_{1-2}$-alkoxy, hydroxyl or acylamino,
$R_2$ is hydrogen, $C_1$-alkoxy, $C_{1-2}$-alkoxyethoxy, chlorine, bromine or combines with $R_3$ to form a group of the formula- *CH(CH$_3$)CH$_2$C(CH$_3$)$_2$— (* attached to the nucleus),
$R_3$ is hydrogen, $C_{1-6}$alkyl, $C_{3-4}$-alkenyl, chloro- or bromo-$C_{3-4}$-alkenyl, $C_{3-4}$-alkynyl, phenyl-$C_{1-3}$-alkyl, $C_{1-4}$-alkoxycarbonyl-$C_{1-3}$-alkyl, $C_{3-4}$-alkenyloxycarbonyl-$C_{1-3}$-alkyl, $C_{3-4}$-alkynyloxycarbonyl-$C_{1-3}$-alkyl, phenoxy-$C_{2-4}$-alkyl, halogen-, cyano-, $C_{1-4}$-alkoxy-, $C_{1-4}$-alkylcarbonyloxy- or $C_{1-4}$-alkoxycarbonyloxy-substituted $C_{2-4}$-alkyl, or a group of the formula —CH$_2$—CH(R$_8$)CH$_2$—R$_9$,
$R_4$ is hydrogen or $C_{1-2}$-alkyl,
$R_5$ is phenyl which may be substituted by one or two substituents selected from the group consisting of methyl, chlorine, bromine and nitro or combines with $R_4$ to form a c-pentanone or c-hexanone ring,
$R_6$ is hydrogen or hydroxyl,
$R_7$ is hydrogen or methyl,
$R_8$ is hydroxyl or $_{1-4}$-alkylcarbonyloxy,
$R_9$ is chlorine, $C_{1-4}$-alkoxy, phenoxy, allyloxy or $C_{1-4}$-alkylcarbonyloxy,
Y is $C_{1-3}$-alkylene, wherein $R_3$ is just hydrogen when K is a radical of the formula $K_2$ or $K_3$.

Excluded from the invention is the dye compound of the formula

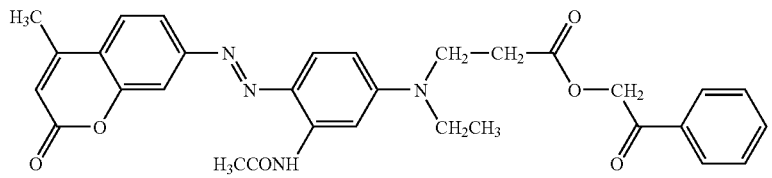

as disclosed in example 29 of WO 2004/035690 A1.

A group of preferred dyes of the formula I conform to the general formula (Ia)

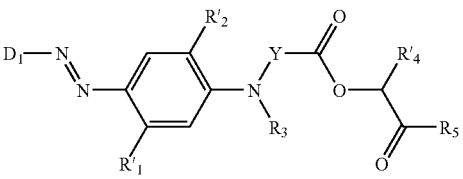

where
$D_1$ is 3-phenyl-1,2,4-thiadiazolyl or conforms to one of the following formulae:

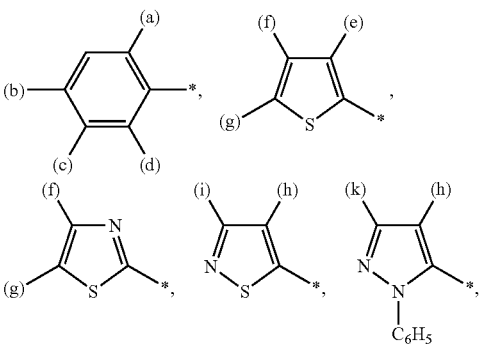

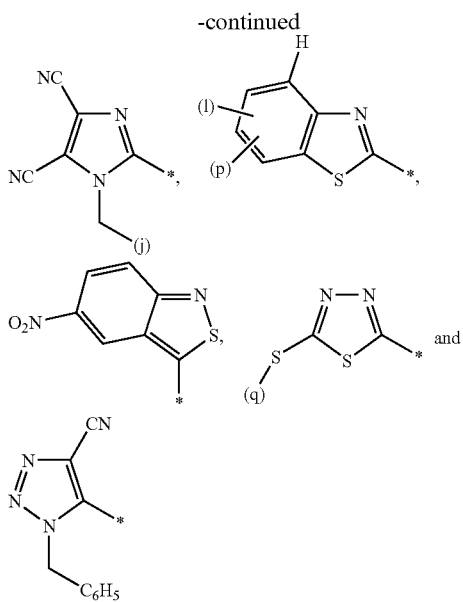

where
(a) is hydrogen, chlorine, bromine, cyano, nitro-, $C_{1-4}$-alkoxycarbonyl, $C_{1-3}$-alkyl-sulphonyl, preferably hydrogen, chlorine, cyano or nitro,
(b) is chlorine, bromine, nitro, methyl, $C_{1-2}$-alkylsulphonyl, $C_{1-4}$-alkylcarbonyl, aminosulphonyl, mono- or di-$C_{1-4}$-alkylaminosulphonyl, phenylaminosulphonyl, $C_{1-4}$-alkoxycarbonyl, benzyloxycarbonyl, tetrahydrofurfuryl-2-oxycarbonyl, $C_{3-4}$-alkenyloxycarbonyl, $C_{3-4}$-alkynyloxycarbonyl, aminocarbonyl, mono- or di-$C_{1-4}$-alkylaminocarbonyl, phenylaminocarbonyl or phenylazo,
(c) is hydrogen or chlorine or else (when d is hydrogen) hydroxyl or rhodan,
(d) is hydrogen, chlorine, bromine, hydroxyl or cyano,
(e) is nitro, $C_{1-4}$-alkylcarbonyl, $C_{1-4}$-alkoxycarbonyl, cyano, aminocarbonyl, mono- or di-$C_{1-4}$-alkylaminocarbonyl,
(f) is hydrogen, chlorine, bromine, $C_{1-2}$-alkyl or phenyl,
(g) is nitro, cyano, formyl, dicyanovinyl or a group of the formula —CH=CH—NO$_2$, —CH=C(CN)CO—OC$_{1-4}$-alkyl, H$_5$C$_6$—N=N— or 3- or 4—NO$_2$—C$_6$H$_4$—N=N—,
(h) is cyano or $C_{1-4}$-alkoxycarbonyl,
(i) is $C_{1-4}$-alkyl or phenyl,
(j) is —CN, —CH=CH$_2$ or phenyl,
(k) is $C_{1-4}$-alkyl,
(l) is hydrogen, chlorine, bromine, cyano, rhodan, nitro, $C_{1-4}$-alkoxycarbonyl or di-$C_{1-4}$-alkylaminosulphonyl,
(p) is hydrogen, chlorine or bromine, and
(q) is $C_{1-4}$-alkyl or $C_{1-4}$-alkoxycarbonyl-$C_{1-4}$-alkyl,
wherein the phenyl nuclei of these substituents may bear one or two substituents selected from the group consisting of chlorine, bromine, methyl and $C_{1-2}$-alkoxy,
$R'_1$ is hydrogen, methyl, chlorine or acylamino,
$R'_2$ is hydrogen, chlorine, $C_{1-2}$-alkoxy, $C_{1-2}$-alkoxyethoxy or combines with $R_3$ to form a group of the formula —CH(CH$_3$)CH$_2$C(CH$_3$)$_2$—,
$R_3$ and $R_5$ are each as defined above,
$R'_4$ is hydrogen or methyl, and
Y is a group of the formula —CH$_2$CH$_2$— or —CH$_2$CH(CH$_3$)—.

Particular preference is given to disperse dyes of the formula (Ib)

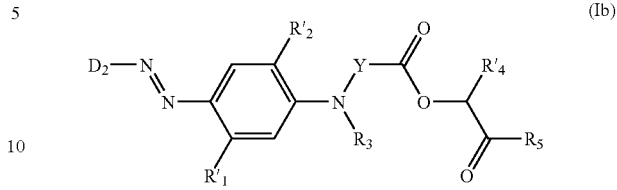

where
$D_2$ is the residue of a diazo component of the formula 2,6-dicyano-4-chloro-, 2,6-dicyano-4-bromo-, 2,6-dicyano-4-methyl-, 2,6-dicyano-4-nitrophenyl, 2,4-dinitro-6-chloro-, 2,4-dinitro-6-bromo- or 2,4-dinitro-6-cyanophenyl, 2-chloro-4-nitro-6-cyanophenyl, 2-bromo-4-nitro-6-cyanophenyl, 2,4-dinitrophenyl, 2,6-dichloro-4-nitrophenyl, 2,6-dibromo-4-nitrophenyl, 2-chloro-4-nitro-6-bromophenyl, 2-chloro-4-nitrophenyl, 2-cyano-4-nitrophenyl, 2,4-dinitro-5,6-dichlorophenyl, 2,5-dichloro-4-nitrophenyl, 4-nitro-phenyl, 4-phenylazophenyl, 4—$C_{1-4}$-alkoxycarbonylphenyl, 2-$C_{1-4}$-alkoxy-carbonyl-4-nitrophenyl, 4-benzyloxycarbonylphenyl, 4-(tetrahydrofurfuryl-2'-oxycarbonyl)phenyl, 3,5-dicyano-4-chloro-thienyl-2, 3,5-dicyano-thienyl-2,3-cyano-5-nitro-thienyl-2, 3-acetyl-5-nitro-thienyl-2, 3,5-dinitro-thienyl-2,3-($C_{1-4}$-alkoxycarbonyl)-5-nitro-thienyl-2, 5-phenylazo-3-cyano-thienyl-2, 5-phenylazo-3-cyano-4-methyl-thienyl-2, 5-nitro-thiazolyl-2, 5-nitrobenzoisothiazolyl-3, 3-methyl-4-cyano-isothiazolyl-5, 3-phenyl-1,2,4-thiadiazolyl-2, 5-($C_{1\ 2}$-alkylmercapto)-1,3,4-thiadiazolyl-2, 3-($C_{1-2}$-alkoxycarbonylethyl-mercapto)-1,2,4-thiadiazolyl-5, 1-cyanomethyl-4,5-dicyano-imidazolyl-2, 6-nitrobenzothiazolyl-2, 5-nitrobenzothiazolyl-2, 6-rhodanbenzothiazolyl-2, 6-chlorobenzothiazolyl-2, (5),6,(7)-dichlorobenzothiazolyl-2, or of the formula

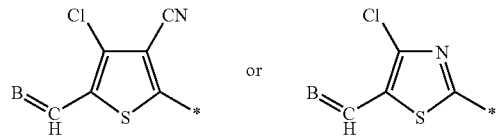

and B is oxygen or a group of the formula =(CN)$_2$, =CH—NO$_2$, =(CN)—COOC$_{1-4}$alkyl or =(CN)—COOC$_{3-4}$alkenyl and the symbols $R'_1$, $R'_2$, $R_3$, $R'_4$, $R_5$ and Y are each as defined above.

Particular preference is further given to the disperse dyes of the formula I where
D is a diazo component selected from the group consisting of 2,4-dinitro-6-chloro-phenyl, 2,4-dinitro-6-bromophenyl, 2,4-dinitro-6-cyanophenyl or 2,6-dicyano4-nitrophenyl,
K is a radical of the formula $K_1$,
$R_1$ is $C_{1-2}$-alkylcarbonylamino with or without bromine, chlorine, hydroxyl or $C_{1-2}$-alkoxy substitution; phenylaminocarbonyl, methylsulphonylamino, methyl or hydrogen,
$R_2$ is $C_{1-2}$-alkoxy or hydrogen,
$R_3$ is hydrogen, $C_{1-4}$-alkyl, cyanoethyl, $C_{1-2}$-alkoxyethyl or $C_{3-4}$-alkenyl R$_4$ is hydrogen,
R$_5$ is phenyl, and
Y is a group of the formula —CH$_2$CH$_2$—.

Useful diazo components include all mono- to binuclear carbo- or heterocyclic organic radicals or residues of aromatic character which can bear customary disperse dye substituents except in particular water-solubilizing substituents, i.e. sulphonic acid groups especially. Useful diazo components further include residues of monoazo compounds. Examples of diazo components are: preferably substituted phenyl, thienyl, thiazolyl, isothiazolyl, thiadiazolyl, pyrazolyl, imidazolyl, triazolyl, benzothiazolyl or benzisothiazolyl radicals.

All the alkyl groups mentioned contain, unless otherwise stated, 1 to 8 and especially 1 to 4 carbon atoms, they can be straight-chain or branched and may be substituted, for example by halogen atoms, preferably bromine or chlorine atoms, hydroxyl, alkoxy, phenyl, phenoxy, cyano, rhodan, acyl, acyloxy or acylamino groups.

The Y interlink is preferably a group of the formula —CH$_2$CH$_2$— or —CH$_2$CH(CH$_3$)— especially —CH$_2$CH$_2$—.

All alkyl, alkylene and alkenyl radicals are straight chain, unless stated otherwise.

The process for preparing the novel dyes of the formula (I) is characterized in that a diazotized amine of the formula (II)

D-NH$_2$              (II)

is coupled with a compound of the formula (III)

H—K              (III).

Diazotizing and coupling are carried out according to commonly known methods.

The compounds of the formulae II and III are known or are easy to prepare from known compounds by methods known to one skilled in the art.

The novel dyes of the formula (I) exhibit excellent exhaustion from an aqueous suspension onto textile material composed of manufactured synthetic or natural polymer hydrophobic macromolecular organic substances. They are particularly useful for dyeing or printing textile material composed of linear aromatic polyesters and also of cellulose acetate and cellulose triacetate.

Dyeing or printing is accomplished by processes known per se, for example those described in French patent 1 445 371.

The dyeings obtained have good allround fastnesses; worth emphasizing are the light fastness, the fastness to dry heat setting and coating and also the excellent wet fastnesses, after thermal stabilization (thermomigration fastness).

The formulae (I) dyes used according to the invention can be used for dyeing and printing manufactured natural polymer and especially synthetic hydrophobic fibre materials, in particular textile materials. Textile materials composed of blend fabrics comprising such manufactured natural polymer or synthetic hydrophobic fibre materials are likewise dyeable or printable with the dyes of the formula (I).

Useful manufactured natural polymer hydrophobic textile materials include for example acetate filament (cellulose acetate) and cellulose triacetate.

Synthetic hydrophobic textile materials consist for example of linear aromatic polyesters, for example polyesters from terephthalic acid and glycols, particularly ethylene glycol, or condensation products of terephthalic acid and 1,4-bis-(hydroxymethyl)-cyclohexane; of polycarbonates, for example those formed from alpha, alpha-dimethyl-4,4'-dihydroxydiphenylmethane and phosgene, of fibres based on polyvinyl chloride and especially on polyamide.

The textile material mentioned may be present at dyeing or printing in the various processing forms, for example as fibre, yarn or web, as a woven or loop-formingly knitted fabric or in the form of carpets.

The dyes of the formula (I) are applied to the textile materials by known dyeing processes. For example, polyester fibre materials are exhaust dyed from an aqueous dispersion in the presence of customary anionic or nonionic dispersants with or without customary carriers at temperatures between 80 and 140° C. Cellulose acetate is preferably dyed at between about 65 to 85° C. and cellulose triacetate at temperatures of up to 115° C.

Polyamide-based fibre materials are preferably dyed at a pH of 3 to 7 and especially 3 to 5. The dyeing is preferably carried out at a temperature of 70 to 110° C. and especially 80 to 105° C.

The liquor ratio depends on the apparatus, the substrate and the make-up form. How
ever, the liquor ratio can be chosen within a wide range, for example from 4:1 to 100:1, but preferably 5:1 to 30:1.

The formula (I) dyes used according to the invention can be applied in the customary dyeing processes, such as for example in the exhaust process, continuous process or printing process.

The formula (I) dyes used according to the invention are also useful for dyeing from short liquors, for example in continuous dyeing processes or batch and continuous foam dyeing processes.

Preference is given to dyeing, especially dyeing by the exhaust process.

The dyeing liquors or print pastes, in addition to water and the dyes, may contain further additives, for example wetting agents, antifoams, levelling agents or agents to influence the properties of the textile material, for example softeners, flame retardants or soil, water and oil repellants, and also water softeners and natural or synthetic thickeners, for example alginates or cellulose ethers.

The amounts in which the dyes of the formula (I) are used in the dyebaths or print pastes can vary within wide limits, depending on the desired depth of shade. Advantageous amounts will generally be in the range from 0.01% to 15% by weight and especially 0.1% to 10% by weight, based on the weight of fibre and based on the print paste, respectively.

The dyes of the formula (I) can likewise be used for mass coloration of polyester. The disperse dyes according to the invention can also first be processed into concentrates in which a polymer which is compatible with the polymer to be coloured serves as a carrier for the disperse dyes. The carrier material should belong to the same category of polymers or be a generally high-compatible substance. This avoids adverse repercussions for the mechanical, thermal and optical properties. Such preparations contain the disperse dyes according to the invention (or generally pigments and/or dyes) in highly concentrated form in a polymer-carrier adapted to the end product and which are used for mass coloration of polymers are customarily termed masterbatches. Alternatively, pellets or liquid formulations (dispersions) or simply dry blends can also be prepared for mass coloration of polymers.

The disperse dyes according to the invention are useful for pigmenting macromolecular organic materials of natural or synthetic origin, for example plastics, resins, coatings, paints, electrophotographic toners and developers, colour filters and also inks, including printing inks.

The disperse dyes according to the invention are also useful as colorants in aqueous and non-aqueous ink jet inks, microemulsion inks and also in such inks which are employed in the hot melt process.

Ink jet inks generally contain in total 0.5% to 15% by weight and preferably 1.5% to 8% by weight (reckoned dry) of one or more of the disperse dyes according to the invention.

Microemulsion inks are based on organic solvents, water and if appropriate an additional hydrotropic substance (interface mediator). Microemulsion inks contain in general 0.5% to 15% by weight and preferably 1.5% to 8% by weight of one or more of the disperse dyes according to the invention, 5% to 99% by weight of water and 0.5% to 94.5% of organic solvent and/or hydrotropic compound.

"Solvent-based" ink jet inks contain preferably 0.5% to 15% by weight of one or more of the disperse dyes according to the invention, 85% to 99.5% by weight of organic solvent and/or hydrotropic compounds.

Hot-melt inks are usually based on waxes, fatty acids, fatty alcohols or sulphonamides which are solid at room temperature and become liquid on heating, the preferred melting range being situated between about 60° C. and about 140° C. Hot-melt ink jet inks consist essentially for example of 20% to 90% by weight of wax and 1% to 10% by weight of one or more of the disperse dyes according to the invention. There may further be included 0% to 20% by weight of an additional polymer (as "dye-dissolver"), 0% to 5% by weight of dispersing assistant, 0% to 20% by weight of viscosity modifier, 0% to 20% by weight of plasticizer, 0% to 10% by weight of tack additive, 0% to 10% by weight of transparency stabilizer (prevents crystallization of waxes, for example) and also 0% to 2% by weight of antioxidant.

Parts and percentages in the examples which follow are by weight. The temperatures are indicated in degrees Celsius.

EXAMPLE 1

16.3 parts of 2-cyano-4-nitroaniline are suspended in 100 parts of cold sulphuric acid 93% and admixed with 32 parts of nitrosylsulphuric acid (40%) at 0-5° C. in the course of 30 minutes. This is followed by 3-4 hours of stirring at 0-5° C., and then the resulting diazonium salt solution is poured continuously with stirring into a mixture of 29.7 parts of phenylcarbonylmethyl 3-(N-methyl-N-phenylamino)-propionate, 100 parts of glacial acetic acid, 2 parts of sulphamic acid, 200 parts of water and 300 parts of ice. The precipitated dye is filtered off, washed acid free with water and dried at 60° C. under reduced pressure. The dye obtained conforms to the formula

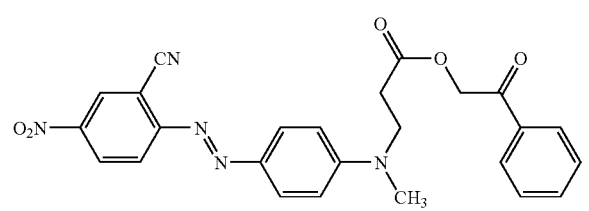

It dyes polyester fibre material in ruby shades having excellent fastnesses, especially very good wet fastnesses after thermal stabilization, and is very useful, alone or in mixtures, for state of the art rapid-dyeing processes such as for example the ®Foron RD process. $\lambda_{max}$=530 nm (DMF)

EXAMPLE 2

26.2 parts of 2-bromo-4,6-dinitroaniline are suspended in 150 parts of sulphuric acid 93% at 15-20° C. and admixed with 32 parts of nitrosylsulphuric acid 40% in the course of 30 minutes. This is followed by 2-3 hours of stirring, and the diazonium salt solution is poured continuously with stirring into a mixture of 36.8 parts of phenylcarbonylmethyl 3-(N-ethyl-N-(3'-acetylamino-phenylamino))-propionate, 100 parts of glacial acetic acid, 2 parts of sulphamic acid, 100 parts of water and 200 parts of ice. The precipitated dye is filtered off, washed acid free with water and dried at 60° C. under reduced pressure. The dye obtained conforms to the formula

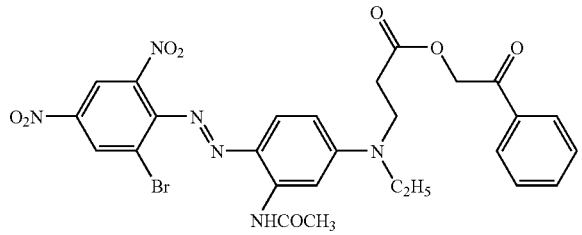

and dyes polyester fibre material in violet shades having excellent fastnesses. The dye, which has $\lambda_{max}$=559 (DMF), is very useful, alone or in navy or black mixtures, for state of the art rapid-dyeing processes such as for example the ®Foron RD process.

EXAMPLE 3

64.1 parts of 2-bromo-4,6-dinitroaniline-1-azo dye (preparation according to Example 2), 1 part of potassium iodide are suspended in 200 parts of dimethyl sulphoxide at 60° C., admixed with 9.8 parts of copper(I) cyanide and stirred for 2-3 hours. The reaction product is filtered off at about 50° C., washed with 50 parts of 1:1 DMSO / water in portions and dried at 60° C. under reduced pressure. The dye obtained conforms to the formula

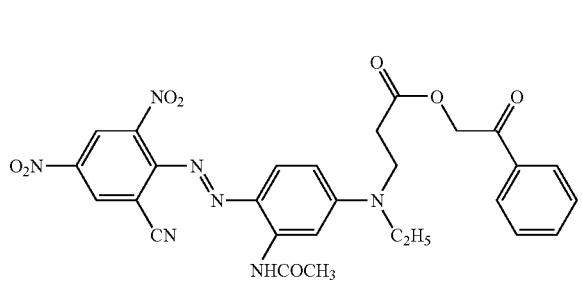

and dyes polyester fibre material in blue shades having excellent fastnesses, especially having excellent wet fastnesses. The dye, which has $\lambda_{max}$=604 (DMF), is, alone or in mixtures, very useful for state of the art rapid-dyeing processes such as for example the ®Foron RD process.

EXAMPLE 4

16.3 parts of 2-amino-4-chloro-5-formylthiazole are dissolved in 100 parts of sulphuric acid 93% and admixed with 32 parts of nitrosylsulphuric acid 40% at 0 to 5° C. in the course of 30 minutes. This is followed by 3 hours of stirring in an icebath, and the diazonium salt solution is poured continuously into a mixture of 41.0 parts of phenylcarbonylmethyl 3-[N-allyl-N-(5'-acetylamino-2'-methoxy-phenylamino)]-propionate, 100 parts of glacial acetic acid, 2 parts of sulphamic acid and 300 parts of ice/water. The precipitated dye is filtered off, washed acid free with water and dried at 60° C. under reduced pressure. The dye obtained, which has $\lambda_{max}$=625 (DMF), conforms to the formula

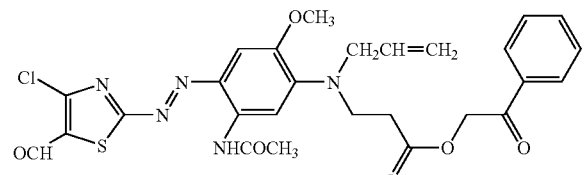

and dyes polyester materials in greenish navy shades and is useful as individual dye or in navy and black mixtures for the ®Foron RD rapid-dyeing process, with very good fastnesses.

EXAMPLE 5

18.6 parts of 2-amino-4-chloro-3-cyano-5-formylthiophene are dissolved in 200 parts of cold sulphuric acid 85%. 32 parts of nitrosylsulphuric acid 40% are added dropwise with stirring at 0 to 5° C. in the course of 30 minutes. This is followed by 3 hours of stirring in an icebath, and the diazonium salt solution is poured continuously into a mixture of 32.5 parts of phenylcarbonylmethyl 3-[N-ethyl-N-(3'-methylphenylamino)]-propionate, 50 parts of 5% sulphuric acid, 2 parts of sulphamic acid and 300 parts of ice. The precipitated dye is filtered off, washed acid free with water and dried at 60° C. under reduced pressure. The dye obtained having $\lambda_{max}$=610 (DMF), conforms to the formula

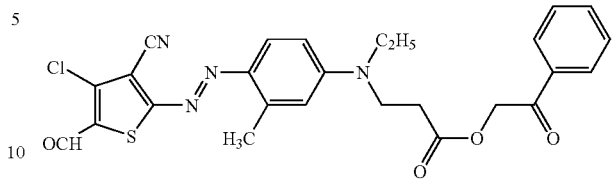

and dyes polyester materials in brilliant reddish blue shades having good fastnesses.

Table 1 below indicates further dyes of the general formula (Ic); they are prepared similarly to Examples 1 to 5.

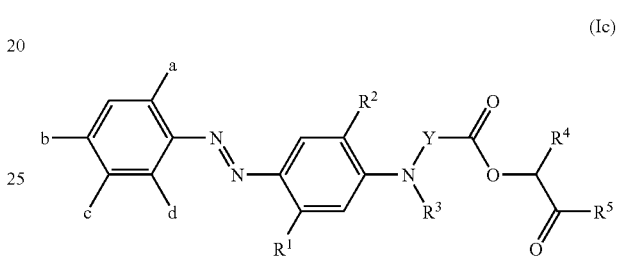

and Table 2 subsequently indicates further dyes of the general formula (Id); they are prepared similarly to Examples 1 to 5.

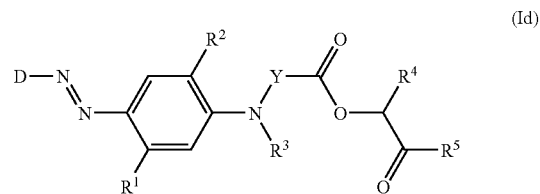

TABLE 1

(dyes of the general formula (Ic))

| Ex. | (a) | (b) | (c) | (d) | Y | R¹ | R² | R³ | R⁴ | R⁵ | $\lambda_{max}$ (DMF) |
|---|---|---|---|---|---|---|---|---|---|---|---|
| 6  | NO₂ | NO₂ | H | Br | —C₂H₄— | NHCOCH₃ | H | n-C₃H₇ | H | C₆H₅ | 560 |
| 7  | NO₂ | NO₂ | H | CN | —C₂H₄— | NHCOCH₃ | H | n-C₃H₇ | H | C₆H₅ | 611 |
| 8  | NO₂ | NO₂ | H | CN | —C₂H₄— | NHCOC₂H₅ | H | C₂H₅ | H | C₆H₅ | 612 |
| 9  | NO₂ | NO₂ | H | CN | —C₂H₄— | NHCOCH₃ | H | CH₂CH=CH₂ | H | C₆H₅ | 608 |
| 10 | NO₂ | NO₂ | H | CN | —C₂H₄— | NHCOCH₃ | H | C₂H₄OCH₃ | H | C₆H₅ | 609 |
| 11 | NO₂ | NO₂ | H | CN | —C₂H₄— | NHCOCH₃ | H | CH₂CHOHCH₂Cl | CH₃ | C₆H₅ | 608 |
| 12 | NO₂ | NO₂ | H | CN | —C₂H₄— | NHCOCH₂Cl | H | C₂H₅ | H | C₆H₅ | 605 |
| 13 | NO₂ | NO₂ | H | CN | —C₂H₄— | NHCOCH₂CH₂Cl | H | C₂H₅ | H | C₆H₅ | 607 |
| 14 | CN  | NO₂ | H | CN | —C₂H₄— | NHCOCH₃ | H | n-C₄H₉ | H | CH₃ | 615 |
| 15 | CN  | NO₂ | H | CN | —C₂H₄— | NHCOCH₃ | H | n-C₃H₇ | H | C₂H₅ | 614 |
| 16 | CN  | NO₂ | H | CN | —C₂H₄— | NHCOCH₃ | H | C₂H₅ | H | C₆H₅ | 613 |
| 17 | NO₂ | NO₂ | H | CN | —C₂H₄— | NHCOCH₃ | H | CH₃ | H | C₆H₅ | 610 |
| 18 | NO₂ | NO₂ | H | CN | —C₂H₄— | NHCOCH₃ | H | CH₂C(CH₃)H=CH₂ | H | C₆H₅ | 612 |
| 19 | NO₂ | NO₂ | H | Cl | —C₂H₄— | NHCOCH₂OCH₃ | OC₂H₅ | H | H | C₆H₅ | 596 |
| 20 | NO₂ | NO₂ | H | Cl | —C₂H₄— | NHCOCH₂Cl | OCH₃ | H | H | C₆H₅ | 594 |
| 21 | NO₂ | NO₂ | H | Cl | —C₂H₄— | NHCOCH=CH₂ | OCH₃ | —C₆H₁₃ | H | C₆H₅ | 608 |
| 22 | NO₂ | NO₂ | H | Cl | —C₂H₄— | NHCHO | OCH₃ | CH₂C₆H₅ | H | C₆H₅ | 602 |
| 23 | NO₂ | NO₂ | H | Cl | —C₂H₄— | NHCOCH₃ | OCH₃ | H | H | C₆H₅ | 596 |
| 24 | NO₂ | NO₂ | H | Br | —C₂H₄— | NHCOCH₃ | OCH₃ | H | H | C₆H₅ | 597 |
| 25 | NO₂ | NO₂ | H | Br | —C₂H₄— | NHCOCH₃ | OCH₃ | C₂H₄OCOCH₃ | H | C₆H₅ | 591 |

TABLE 1-continued (dyes of the general formula (Ic))

| Ex. | (a) | (b) | (c) | (d) | Y | $R^1$ | $R^2$ | $R^3$ | $R^4$ | $R^5$ | $\lambda_{max}$ (DMF) |
|---|---|---|---|---|---|---|---|---|---|---|---|
| 26 | NO$_2$ | NO$_2$ | H | J | —C$_2$H$_4$— | NHCOCH$_3$ | OCH$_3$ | C$_2$H$_4$OCH$_3$ | H | C$_6$H$_5$ | 594 |
| 27 | NO$_2$ | NO$_2$ | H | CN | —C$_2$H$_4$— | NHCOCH$_3$ | H | CH$_2$CH$_2$CH$_2$Cl | H | C$_6$H$_5$ | 609 |
| 28 | NO$_2$ | NO$_2$ | H | CN | —CHCH$_3$CH$_2$— | NHCOCH$_3$ | H | C$_2$H$_4$OC$_2$H$_4$OCH$_3$ | H | C$_6$H$_5$ | 608 |
| 29 | NO$_2$ | NO$_2$ | H | CN | —C$_2$H$_4$— | NHCOCH$_3$ | H | CH$_2$CH$_2$CH$_2$CH$_2$OCOCH$_3$ | H | C$_6$H$_5$ | 612 |
| 30 | NO$_2$ | NO$_2$ | H | CN | —C$_2$H$_4$— | NHCOCH$_3$ | H | CH$_2$CH(OCOCH$_3$)CH$_3$ | H | C$_6$H$_5$ | 601 |
| 31 | CN | NO$_2$ | H | CN | —C$_2$H$_4$— | NHCOCH$_3$ | H | CH$_2$C$_6$H$_5$ | H | C$_6$H$_5$ | 597 |
| 32 | CN | NO$_2$ | H | CN | —C$_2$H$_4$— | NHCOC$_2$H$_5$ | H | CH$_2$C$_6$H$_5$ | H | C$_6$H$_5$ | 598 |
| 33 | CN | NO$_2$ | H | CN | —C$_2$H$_4$— | NHCOCH$_3$ | OCH$_3$ | CH$_2$C$_6$H$_5$ | H | C$_6$H$_5$ | 635 |
| 34 | NO$_2$ | NO$_2$ | H | Br | —C$_2$H$_4$— | NHCOCH$_3$ | OCH$_3$ | CH$_2$C$_6$H$_5$ | H | C$_6$H$_5$ | 593 |
| 35 | NO$_2$ | NO$_2$ | H | Cl | —C$_2$H$_4$— | NHCOCH$_3$ | OCH$_3$ | CH$_2$C$_6$H$_5$ | CH$_3$ | C$_6$H$_5$ | 594 |
| 36 | NO$_2$ | NO$_2$ | H | Cl | —(CH$_2$)$_3$— | NHCOOCH$_3$ | OCH$_3$ | C$_2$H$_4$OCOCH$_3$ | H | C$_6$H$_5$ | 591 |
| 37 | CN | NO$_2$ | H | Br | —C$_2$H$_4$— | NHCOCH$_3$ | H | C$_2$H$_5$ | H | *—(CH$_2$)$_3$— | 584 |
| 38 | CN | NO$_2$ | H | Br | —C$_2$H$_4$— | NHCOC$_2$H$_5$ | H | n-C$_3$H$_7$ | H | C$_6$H$_5$ | 585 |
| 39 | CN | NO$_2$ | H | Cl | —C$_2$H$_4$— | NHCOCH$_3$ | H | C$_2$H$_5$ | H | C$_6$H$_5$ | 584 |
| 40 | CN | NO$_2$ | H | H | —C$_2$H$_4$— | NHCOCH$_3$ | H | C$_2$H$_5$ | H | C$_6$H$_5$ | 554 |
| 41 | CN | NO$_2$ | H | H | —CHCH$_3$CH$_2$— | NHCOCH$_3$ | H | C$_2$H$_5$ | H | C$_6$H$_5$ | 555 |
| 42 | CN | NO$_2$ | H | H | —C$_2$H$_4$— | H | H | CH$_2$CH=CH$_2$ | H | C$_6$H$_5$ | 532 |
| 43 | CN | NO$_2$ | H | H | —C$_2$H$_4$— | H | H | CH$_2$C$_6$H$_5$ | H | C$_6$H$_5$ | 530 |
| 44 | CN | NO$_2$ | H | H | —C$_2$H$_4$— | H | H | C$_2$H$_4$OC$_6$H$_5$ | H | C$_6$H$_5$ | 534 |
| 45 | Cl | NO$_2$ | H | H | —C$_2$H$_4$— | NHCOCH$_3$ | H | CH$_2$CH=CH$_2$ | H | C$_6$H$_5$ | 527 |
| 46 | Cl | NO$_2$ | H | H | —C$_2$H$_4$— | NHCOCH$_3$ | H | CH$_2$COOC$_2$H$_5$ | H | C$_6$H$_5$ | 517 |
| 47 | COOCH$_3$ | NO$_2$ | H | H | —C$_2$H$_4$— | NHCOCH$_3$ | H | CH$_2$C$_6$H$_5$ | H | C$_6$H$_5$ | 528 |
| 48 | Cl | NO$_2$ | H | H | —C$_2$H$_4$— | NHCOCH$_3$ | H | CH$_2$C$_6$H$_5$ | H | C$_6$H$_5$ | 525 |
| 49 | Cl | SO$_2$CH$_3$ | H | H | —C$_2$H$_4$— | NHCOCH$_3$ | H | C$_2$H$_5$ | H | C$_6$H$_5$ | 499 |
| 50 | Cl | NO$_2$ | H | H | —C$_2$H$_4$— | NHCOCH$_3$ | Cl | H | H | C$_6$H$_5$ | 505 |
| 51 | OH | NO$_2$ | H | H | —C$_2$H$_4$— | NHCOCH$_2$OCH$_3$ | H | CH$_2$CH=CH$_2$ | H | C$_6$H$_5$ | 520 |
| 52 | OH | NO$_2$ | H | H | —C$_2$H$_4$— | NHCOCH$_3$ | H | CH$_2$C$_6$H$_5$ | H | C$_6$H$_5$ | 516 |
| 53 | OH | NO$_2$ | H | H | —C$_2$H$_4$— | H | H | C$_2$H$_5$ | H | C$_6$H$_5$ | 518 |
| 54 | CN | Br | H | CN | —C$_2$H$_4$— | OH | H | C$_2$H$_4$OCOCH$_2$COC$_6$H$_5$ | H | C$_6$H$_5$ | 510 |
| 55 | CN | CH3 | H | CN | —C$_2$H$_4$— | NHCOCH$_3$ | H | CH$_2$C$_6$H$_5$ | H | C$_6$H$_5$ | 526 |
| 56 | H | NO$_2$ | H | H | —C$_2$H$_4$— | H | Cl | H | H | C$_6$H$_5$ | 450 |
| 57 | H | NO$_2$ | H | H | —C$_2$H$_4$— | NHCOCH$_3$ | H | C$_2$H$_5$ | H | *—(CH$_2$)$_4$— | 514 |
| 58 | H | NO$_2$ | H | H | —C$_2$H$_4$— | NHCOCH$_3$ | H | CH$_2$C$_6$H$_5$ | H | C$_6$H$_5$ | 507 |
| 59 | NO$_2$ | NO$_2$ | SCN | H | —C$_2$H$_4$— | CH$_3$ | OCH$_3$ | H | H | C$_6$H$_5$ | 601 |
| 60 | NO$_2$ | NO$_2$ | SCN | H | —C$_2$H$_4$— | NHCOCH$_3$ | OCH$_3$ | H | H | C$_6$H$_5$ | 621 |

TABLE 2

(dyes of the general formula (Id))

| Ex. | D | Y | $R^1$ | $R^2$ | $R^3$ | $R^4$ | $R^5$ | $\lambda_{max}$(DMF) |
|---|---|---|---|---|---|---|---|---|
| 61 | 4-Chloro-5-formylthiazolyl-2 | —C$_2$H$_4$— | H | H | C$_2$H$_5$ | H | C$_6$H$_5$ | 563 |
| 62 | 4-Chloro-5-formylthiazolyl-2 | —C$_2$H$_4$— | CH$_3$ | H | C$_2$H$_5$ | H | C$_6$H$_5$ | 586 |
| 63 | 4-Chloro-5-formylthiazolyl-2 | —C$_2$H$_4$— | CH$_3$ | OCH$_3$ | CH$_2$CH=CH$_2$ | H | C$_6$H$_5$ | 609 |
| 64 | 4-Chloro-5-formylthiazolyl-2 | —C$_2$H$_4$— | NHCOCH$_3$ | OCH$_3$ | CH$_2$C$_6$H$_5$ | H | C$_6$H$_5$ | 622 |
| 65 | 4-Chloro-5-formylthiazolyl-2 | —C$_2$H$_4$— | NHCOCH$_3$ | OCH$_3$ | H | H | C$_6$H$_5$ | 608 |
| 71 | 5-Nitro-thiazolyl-2 | —C$_2$H$_4$— | H | H | C$_2$H$_5$ | H | C$_6$H$_5$ | 587 |
| 72 | 5-Nitro-thiazolyl-2 | —C$_2$H$_4$— | CH3 | H | C$_2$H$_5$ | H | C$_6$H$_5$ | 606 |
| 73 | 5-Nitro-thiazolyl-2 | —C$_2$H$_4$— | NHCOCH$_3$ | OCH$_3$ | H | H | C$_6$H$_5$ | 630 |
| 66 | 4-Chloro-3-cyano-5-formylthienyl-2 | —C$_2$H$_4$— | H | H | C$_2$H$_5$ | H | C$_6$H$_5$ | 593 |
| 67 | 4-Chloro-3-cyano-5-formylthienyl-2 | —C$_2$H$_4$— | CH$_3$ | H | C$_2$H$_5$ | H | C$_6$H$_5$ | 608 |
| 68 | 4-Chloro-3-cyano-5-formylthienyl-2 | —C$_2$H$_4$— | NHCOCH$_3$ | H | C$_2$H$_5$ | CH$_3$ | C$_6$H$_5$ | 606 |
| 69 | 4-Chloro-3-cyano-5-formylthienyl-2 | —C$_2$H$_4$— | NHCOCH$_3$ | OCH$_3$ | H | H | C$_6$H$_5$ | 630 |
| 70 | 4-Chloro-3-cyano-5-formylthienyl-2 | —C$_2$H$_4$— | NHCOCH$_3$ | OCH$_3$ | C$_2$H$_5$ | H | C$_6$H$_5$ | 652 |
| 71 | 3,5-Dinitro-thienyl-2 | —C$_2$H$_4$— | NHCOCH$_3$ | H | C$_2$H$_5$ | H | C$_6$H$_5$ | 633 |
| 72 | 3,5-Dinitro-thienyl-2 | —C$_2$H$_4$— | CH$_3$ | H | c$_2$H$_5$ | H | C$_6$H$_5$ | 637 |
| 73 | 3,5-Dinitro-thienyl-2 | —C$_2$H$_4$— | H | H | C$_2$H$_5$ | H | C$_6$H$_5$ | 625 |
| 74 | 4-Cyano-3-methyl-isothiazolyl-5 | —C$_2$H$_4$— | H | H | C$_2$H$_5$ | H | C$_6$H$_5$ | 543 |
| 75 | 4-Cyano-3-methyl-isothiazolyl-5 | —C$_2$H$_4$— | NHCOCH$_3$ | H | CH$_2$CH=CHCl | H | C$_6$H$_5$ | 545 |
| 76 | 5-Ethylmercapto-1,3,4-thiadiazolyl-2 | —C$_2$H$_4$— | NHCOCH$_3$ | H | C$_2$H$_5$ | H | C$_6$H$_5$ | 520 |
| 77 | 5-Ethylmercapto-1,3,4-thiadiazolyl-2 | —C$_2$H$_4$— | CH$_3$ | H | C$_2$H$_5$ | H | C$_6$H$_5$ | 518 |
| 78 | 5-Ethylmercapto-1,3,4-thiadiazolyl-2 | —C$_2$H$_4$— | H | H | C$_2$H$_5$ | H | C$_6$H$_5$ | 513 |
| 79 | (5),6-,(7)-Dichlorobenzothiazolyl-2 | —C$_2$H$_4$— | H | H | C$_2$H$_5$ | H | C$_6$H$_5$ | 535 |
| 80 | (5),6-,(7)-Dichlorobenzothiazolyl-2 | —C$_2$H$_4$— | CH$_3$ | H | CH$_2$CH=CH$_2$ | H | C$_6$H$_5$ | 537 |
| 81 | (5),6-,(7)-Dichlorobenzothiazolyl-2 | —C$_2$H$_4$— | NHCOCH$_3$ | H | C$_2$H$_4$CN | H | C$_6$H$_5$ | 530 |
| 82 | 6-Nitro-benzothiazolyl-2 | —C$_2$H$_4$— | H | H | C$_2$H$_5$ | H | C$_6$H$_5$ | 533 |
| 83 | 6-Methylsulphonyl-benzothiazolyl-2 | —C$_2$H$_4$— | H | H | C$_2$H$_5$ | H | C$_6$H$_5$ | 529 |
| 84 | 5-Nitro-2,1-benzisothiazolyl-3 | —C$_2$H$_4$— | H | H | C$_2$H$_5$ | H | C$_6$H$_5$ | 603 |
| 85 | 1-Cyanomethyl-4,5-dicyano-imidazolyl-2 | —C$_2$H$_4$— | CH$_3$ | H | C$_2$H$_5$ | H | C$_6$H$_5$ | 525 |
| 86 | 3-Cyano-5-phenylazo-thienyl-2 | —C$_2$H$_4$— | H | H | C$_2$H$_5$ | H | C$_6$H$_5$ | 615 |

TABLE 2-continued (dyes of the general formula (Id))

| Ex. D | | Y | R¹ | R² | R³ | R⁴ | R⁵ | $\lambda_{max}$(DMF) |
|---|---|---|---|---|---|---|---|---|
| 87 | 4-Cyano-3-methyl-1-phenylpyrazolyl-5 | —$C_2H_4$— | NHCOCH₃ | H | CH₂CH=CHCl | H | C₆H₅ | 528 |
| 88 | 4-Cyano-3-methyl-1-phenylpyrazolyl-5 | —$C_2H_4$— | NHCOCH₃ | H | CH₂CH=CH₂ | H | C₆H₅ | 533 |
| 89 | 4-Cyano-1-benzyl-1,2,3-triazolyl-5 | —$C_2H_4$— | NHCOCH₃ | H | C₂H₅ | H | C₆H₅ | 536 |
| 90 | 4-Cyano-1-benzyl-1,2,3-triazolyl-5 | —$C_2H_4$— | NHCOC₂H₅ | H | CH₂CH=CHCl | H | C₆H₅ | 529 |

The invention claimed is:

1. A disperse dye of formula (Ia)

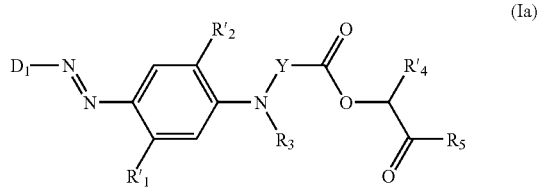

where $D_1$ is 3-phenyl-1,2,4-thiadiazolyl or conforms to one of the following formulae:

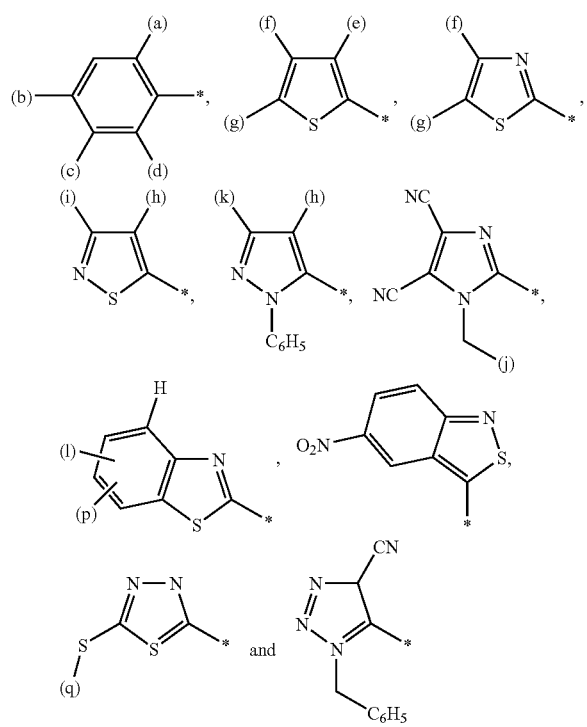

where (a) is hydrogen, chlorine, bromine, cyano, nitro-, $C_{1-4}$-alkoxycarbonyl or $C_{1-3}$-alkyl-sulphonyl, (b) is chlorine, bromine, nitro, methyl, $C_{1-2}$-alkylsulphonyl, $C_{1-4}$-alkylcarbonyl, aminosulphonyl, mono- or di-$C_{1-4}$-alkylaminosulphonyl, phenylaminosulphonyl, $C_{1-4}$-alkoxycarbonyl, benzyloxycarbonyl, tetrahydrofurfuryl-2-oxycarbonyl, $C_{3-4}$-alkenyloxycarbonyl, $C_{3-4}$-alkynyloxycarbonyl, aminocarbonyl, mono- or di-$C_{1-4}$-alkylaminocarbonyl, phenylaminocarbonyl or phenylazo, (c) is hydrogen or chlorine or when (d) is hydrogen, (c) is hydroxyl or rhodan, (d) is hydrogen, chlorine, bromine, hydroxyl or cyano, (e) is nitro, $C_{1-4}$-alkylcarbonyl, $C_{1-4}$-alkoxycarbonyl, cyano, aminocarbonyl, or mono- or di-$C_{1-4}$-alkylaminocarbonyl, (f) is hydrogen, chlorine, bromine, $C_{1-2}$-alkyl or phenyl, (g) is nitro, cyano, formyl, dicyanovinyl or a group of the formula —CH=CH—NO₂, —CH=C(CN)CO—OC$_{1-4}$-alkyl, H₅C₆—N=N—or 3- or 4-NO₂—C₆H₄—N=N—, (h) is cyano or $C_{1-4}$-alkoxycarbonyl, (i) is $C_{1-4}$-alkyl or phenyl, (j) is —CN, —CH=CH2 or phenyl, (k) is $C_{1-4}$-alkyl, (l) is hydrogen, chlorine, bromine, cyano, rhodan, nitro, $C_{1-4}$-alkoxycarbonyl or di-$C_{1-4}$-alkylaminosulphonyl, (p) is hydrogen, chlorine or bromine, and (q) is $C_{1-4}$-alkyl or $C_{1-4}$-alkoxycarbonyl-$C_{1-4}$-alkyl, wherein the phenyl nuclei of these substituents optionally have one or two substituents selected from the group consisting of chlorine, bromine, methyl and $C_{1-2}$-alkoxy, R'₁ is hydrogen, methyl, chlorine or acylamino, R'₂ is hydrogen, chlorine, $C_{1-2}$-alkoxy, $C_{1-2}$-alkoxyethoxy or combines with R₃ to form a group of the formula —CH(CH₃)CH₂C(CH₃)₂—, R₃ is hydrogen, $C_{1-6}$-alkyl, $C_{3-4}$-alkenyl, chloro- or bromo-$C_{3-4}$-alkenyl, phenyl-$C_{1-3}$-alkyl, $C_{1-4}$-alkoxycarbonyl-$C_{1-3}$-alkyl, $C_{3-4}$-alkenyloxycarbonyl-$C_{1-3}$-alkyl, $C_{3-4}$-alkynyloxycarbonyl-$C_{1-3}$-alkyl, phenoxy -$C_{2-4}$-alkyl, halogen-, cyano-, $C_{1-4}$-alkoxy-, $C_{1-4}$-alkylcarbonyloxy- or $C_{1-4}$-alkoxycarbonyloxy-substituted $C_{2-4}$-alkyl, or a group of the formula —CH₂—CH(R₈)CH₂—R₉, wherein R₈ is hydroxyl or $C_{1-4}$-alkylcarbonyloxy, R₉ is chlorine, $C_{1-4}$-alkoxy, phenoxy, allyloxy or $C_{1-4}$-alkylcarbonyloxy, R₅ is phenyl optionally substituted by one or two substituents selected from the group consisting of methyl, chlorine, bromine and nitro or combines with R₄ to form a c-pentanone or c-hexanone ring, wherein R₄ is hydrogen or $C_{1-2}$-alkyl, and Y is a group of the formula —CH₂CH₂— or —CH₂CH(CH₃)—.

2. A disperse dye according of formula (Ib)

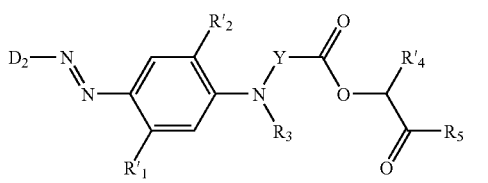

where

D$_2$ is the residue of a diazo component of the formula 2,6-dicyano-4-chloro-, 2,6-dicyano-4-bromo-, 2,6-dicyano-4-methyl- or 2,6-dicyano-4-nitrophenyl, 2,4-dinitro-6-chloro-, 2,4-dinitro-6-bromo- or 2,4-dinitro-6-cyanophenyl, 2-chloro-4-nitro-6-cyanophenyl, 2-bromo-4-nitro-6-cyanophenyl, 2,4-dinitrophenyl, 2,6-dichloro-4-nitrophenyl, 2,6-dibromo-4-nitrophenyl, 2-chloro-4-nitro-6-bromophenyl, 2-chloro-4-nitrophenyl, 2-cyano-4-nitrophenyl, 2,4-dinitro-5,6-dichlorophenyl, 2,5-dichloro-4-nitrophenyl, 4-nitro-phenyl, 4-phenylazophenyl, 4-C$_{1-4}$-alkoxycarbonylphenyl, 2-C$_{1-4}$-alkoxy-carbonyl-4-nitrophenyl, 4-benzyloxycarbonylphenyl, 4-(tetrahydrofurfuryl-2'-oxycarbonyl)phenyl, 3,5-dicyano-4-chloro-thienyl-2, 3,5-dicyano-thienyl-2, 3-cyano-5-nitro-thienyl-2, 3-acetyl-5-nitro-thienyl-2, 3,5-dinitro-thienyl-2, 3-(C$_{1-4}$-alkoxycarbonyl)-5-nitro-thienyl-2, 5-phenylazo-3-cyano-thienyl-2, 5-phenylazo-3-cyano-4-methyl-thienyl-2, 5-nitro-thiazolyl-2, 5-nitrobenzoisothiazolyl-3, 3-methyl-4-cyano-isothiazolyl -5, 3-phenyl-1,2,4-thiadiazolyl-2, 5-(C$_{1-2}$-alkylmercapto)-1,3,4-thiadiazolyl -2, 3-(C$_{1-2}$-alkoxycarbonylethylmercapto)-1,2,4-thiadiazolyl-5, 1-cyanomethyl-4,5-dicyano-imidazolyl-2, 6-nitrobenzothiazolyl-2, 5-nitrobenzothiazolyl-2, 6-rhodanbenzothiazolyl-2, 6-chlorobenzothiazolyl-2, (5),6,(7)-dichlorobenzothiazolyl-2, or of the formula

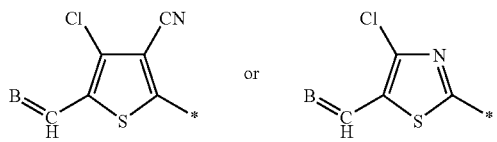

and B is oxygen or a group of the formula =(CN)$_2$, =CH—NO$_2$, =(CN)—COOC$_{1-4}$alkyl or =(CN)—COOC$_{3-4}$alkenyl and the symbols R$_3$, R$_5$ and Y are each as defined below, and R'$_1$ is hydrogen, methyl, chlorine or acylamino, R'$_2$ is hydrogen, chlorine, C$_{1-2}$-alkoxy, C$_{1-2}$-alkoxyethoxy or combines with R$_3$ to form a group of the formula —CH(CH$_3$)CH$_2$C(CH$_3$)$_2$—, R$_3$ is hydrogen, C$_{1-6}$-alkyl, C$_{3-4}$-alkenyl, chloro- or bromo-C$_{3-4}$-alkynl, phenyl-C$_{1-3}$-alkyl, C$_{1-4}$-alkoxycarbonyl-C$_{1-3}$-alkyl, C$_{3-4}$-alkenyloxycarbonyl-C$_{1-3}$-alkyl, C$_{3-4}$-alkynyloxycarbonyl-C$_{1-3}$-alkyl, phenoxy-C$_{2-4}$-alkyl, halogen-, cyano-, C$_{1-4}$-alkoxy-, C$_{1-4}$-alkylcarbonloxy- or C$_{1-4}$-alkoxycarbonyloxy-substituted C$_{2-4}$-alkyl, or a group of the formuula —CH$_2$—CH(R$_8$)CH$_2$—R$_9$, wherein R$_8$ is hydroxyl or C$_{1-4}$-alkylcarbonyloxy, R$_9$ is chlorine, C$_{1-4}$-alkoxy, phenoxy, allyloxy or C$_{1-4}$-alkylcarbonyloxy, Y is a group of the formula —CH$_2$CH$_2$—or —CH$_2$(CH$_3$)—and R$_5$ is phenyl optionally substituted by one or two substituents selected from the group consisting of methyl, chlorine, bromine and nitro or combines with R$_4$ to form a c-pentanone or c-hexanone ring, wherein R$_4$ is hydrogen or C$_{1-2}$-alkyl.

3. A process for preparing a dye of the formula (Ia), according to claim 1, comprising the step of coupling a diazotized amine of the formula (II)

$$D_1\text{-}NH_2 \qquad (II)$$

with a compound of the formula (IIIa)

$$H\text{—}K\text{—}N(R_3)\text{—}Y\text{—}C(O)\text{—}O\text{—}CH(R_4)\text{—}C(O)\text{—}R_5, \qquad (IIIa)$$

wherein K is an aromatic radical of the formula K$_1$

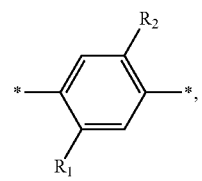

and wherein

R$_1$ is hydrogen, methyl, chlorine or acylamino,

R$_2$ is hydrogen, chlorine, C$_{1-2}$-alkoxy, C$_{1-2}$alkoxyethoxy or combines with R$_3$ to form a group of the formula —CH(CH$_3$)CH$_2$C(CH$_3$)$_2$—, R$_3$ is hydrogen, C$_{1-6}$-alkyl, C$_{3-4}$-alkenyl, chloro- or bromo-C$_{3-4}$-alkyl, C$_{3-4}$-alkynl, phenyl-C$_{1-3}$-alkyl, C$_{1-4}$-alkoxycarbonyl-C$_{1-3}$-alkyl, C$_{3-4}$-alkenyloxycarbonyl-C$_{1-3}$-alkyl, C$_{3-4}$-alkynyloxycarbonyl-C$_{1-3}$-alkyl, phenoxy -C$_{2-4}$-alkyl, halogen-, cyano-, C$_{1-4}$-alkoxy-, C$_{1-4}$-alkylcarbonloxy- or C$_{1-4}$-alkoxycarbonyloxy-substituted C$_{2-4}$-alkyl, or a group of the formula —CH$_2$—CH(R$_8$)CH$_2$-R$_9$, R$_4$ is hydrogen or C$_{1-2}$alkyl-, R$_5$ is phenyl optionally substituted by one or two substituents selected from the group consisting of methyl, chlorine, bromine and nitro or combines with R$_4$ to form a c-pentanone or c-hexanone ring.

4. A method for dyeing or printing or both a hydrophobic fibrous material comprising the step of contacting at least one dye according to claim 1 with the hydrophobic fibrous material.

5. A method for printing a hydrophobic fibrous material comprising the step of contacting at least one dye according to claim 1 with the hydrophobic fibrous material with an ink jet printing device or a hot melt ink jet printing device.

6. A composition comprising at least one dye according to claim 1.

7. A fibrous material printed or dyed or both with at least one dye according to claim 1.

8. A method according to claim 4 wherein the hydrophobic fibrous material is polyester, acetate, triacetate fiber or a mixture thereof.

9. A disperse dye according to claim 1 wherein (a) is hydrogen, chlorine, cyano or nitro.

* * * * *